(12) United States Patent
Wang et al.

(10) Patent No.: US 8,195,098 B2
(45) Date of Patent: Jun. 5, 2012

(54) METHOD FOR BEAMFORMING TRAINING AND COMMUNICATIONS APPARATUSES UTILIZING THE SAME

(75) Inventors: Chao-Chun Wang, Taipei (TW);
Yuh-Ren Jauh, TaoYuan (TW);
Chih-Shi Yee, Hsinchu County (TW)

(73) Assignee: Mediatek Singapore Pte. Ltd., Singapore (SG)

( * ) Notice: Subject to any disclaimer, the term of this patent is extended or adjusted under 35 U.S.C. 154(b) by 252 days.

(21) Appl. No.: 12/753,179

(22) Filed: Apr. 2, 2010

(65) Prior Publication Data
US 2010/0254466 A1    Oct. 7, 2010

Related U.S. Application Data

(60) Provisional application No. 61/166,279, filed on Apr. 3, 2009.

(51) Int. Cl.
*H04B 17/00*    (2006.01)
(52) U.S. Cl. ................ 455/67.14; 455/67.11; 455/456.1; 370/241; 375/259
(58) Field of Classification Search ................ 455/41.2, 455/67.11, 67.14, 88, 456.1, 515; 370/241; 375/259
See application file for complete search history.

(56) References Cited

U.S. PATENT DOCUMENTS

| | | | |
|---|---|---|---|
| 2007/0121751 A1* | 5/2007 | Li et al. | 375/267 |
| 2009/0046010 A1* | 2/2009 | Niu et al. | 342/373 |
| 2009/0080560 A1* | 3/2009 | Na et al. | 375/267 |

FOREIGN PATENT DOCUMENTS

| | | |
|---|---|---|
| CN | 101218758 | 7/2008 |
| CN | 101262264 | 9/2008 |
| WO | WO 2009/039067 | 3/2009 |

OTHER PUBLICATIONS

PCT Search Report dated Jun. 17, 2010.
English language translation of abstract of CN 101218758 (published Jul. 9, 2008).
English language translation of abstract of CN 101262264 (published Sep. 10, 2008).

\* cited by examiner

*Primary Examiner* — Tuan H Nguyen
(74) *Attorney, Agent, or Firm* — Thomas|Kayden

(57) ABSTRACT

A communication system includes a trainee communications device and one or more trainer communications devices. The trainee communications device announces a first period of time for beamforming training, switches a receiving antenna pattern to a sector and stays in the sector for a second period of time. The trainer communications devices transmit one or more predetermined bit sequences in the first period of time. The predetermined bit sequences are transmitted in at least one sector. Each of the predetermined bit sequences carries an identifier identifying the transmitting trainer communications device. The trainee communications device further estimates channel characteristics and computes receiving antenna weighting vectors of the trainer communications devices by using the received predetermined bit sequences, respectively, and the trainer communications devices obtain pertinent information including the estimated channel characteristics and receiving time of the predetermined bit sequences about beamforming training from the trainee communications device.

19 Claims, 4 Drawing Sheets

METHOD FOR BEAMFORMING TRAINING AND COMMUNICATIONS APPARATUSES UTILIZING THE SAME

CROSS REFERENCE TO RELATED APPLICATIONS

This application claims the benefit of U.S. Provisional Application No. 61/166,279 filed Apr. 3, 2009, and entitled "A Method And System For Beamforming Training Between A Master Communications Device And A Plurality Of Client Communications Devices". The entire contents of which are hereby incorporated by reference.

BACKGROUND OF THE INVENTION

1. Field of the Invention

The invention relates to a method for beamforming training, and more particularly to a method for beamforming training a trainee communications device with one or more trainer communications devices in a communications system.

2. Description of the Related Art

Beamforming techniques that use multiple antennas at both the transmitter and receiver ends may be applied in a communications system to improve communications performance. Generally, the communications devices employing multiple antennas need to be trained in order to obtain optimum Tx and/or Rx antenna configurations before data transmission. For a conventional beamforming training procedure, a communications device transmits one or more predetermined beamforming training bit-sequences to a peer communications device via a one-to-one training procedure. Particularly, for high frequency applications, such as a millimeter wave communications system, it is preferable that only one communications device be trained during a training session due to directionality of the antenna.

Based on the conventional beamforming training method, when there are more than one communications device in a communications system, a great number, which amounts to the square of the number of communications devices, of sessions and messages are required for the training procedure. For communications devices to exchange data over an asymmetrical channel with asymmetrical configurations, the amount of training sessions and messages are quadrupled in order to establish a bi-directional communications path, which seriously degrades training efficiency. Thus, a novel beamforming training method that is able to solve the foregoing inefficiencies is highly required.

BRIEF SUMMARY OF THE INVENTION

Communications systems and methods for beamforming training a trainee communications device with one or more trainer communications devices in a communications system are provided. An embodiment of a method for beamforming training a trainee communications device with one or more trainer communications devices in a communications system comprises: announcing a first period of time for receiving one or more predetermined bit sequences from the one or more trainer communications devices, wherein each of the one or more predetermined bit sequences carries an identifier identifying a trainer communications device; switching a receiving antenna pattern of the trainee communications device to a sector in accordance with a first predetermined rule, wherein an angle of the sector is set in accordance with the configuration of the receiving antenna pattern; staying in the sector for a second period of time in accordance with a second predetermined rule and listening for the one or more predetermined bit sequences; estimating channel characteristics and computing receiving antenna weighting vectors of the one or more trainer communications devices by using the corresponding received one or more predetermined bit sequences, respectively; and transmitting pertinent information about beamforming training to the corresponding one or more trainer communications devices by using the identifier, wherein the information comprises the estimated channel characteristics and receiving time of the one or more predetermined bit sequences, respectively.

Another embodiment of a method for beamforming training a trainee communications device with a trainer communications device in a communications system with a plurality of trainer communications devices, comprises: receiving an announcement from the trainee communications device about a first period of time reserved for receiving one or more predetermined bit sequences; transmitting the one or more predetermined bit sequences in at least one sector selected in accordance with a first predetermined rule for a second period of time in accordance with a second predetermined rule, wherein an angle of the at least one sector is set in accordance with the configuration of transmitting antenna pattern of the trainer communications device, and wherein each of the one or more predetermined bit sequences carries an identifier identifying the trainer communications device; and obtaining pertinent information about beamforming training from the trainee communications device, wherein the information comprises channel characteristics and receiving time of the one or more pre-determined bit sequences at the trainee communications device. The channel characteristics are estimated by the trainee communications device by using the received one or more pre-determined bit sequences.

Another embodiment of a communication system with a plurality of communications devices comprises a trainee communications device and one or more trainer communications devices. The trainee communications device announces a first period of time for beamforming training with one or more trainer communications devices, switches a receiving antenna pattern to a sector in accordance with a first predetermined rule and stays in the sector for a second period of time in accordance with a second predetermined rule. An angle of the sector is set in accordance with the configuration of the receiving antenna pattern. The one or more trainer communications devices transmit one or more predetermined bit sequences in the first period of time for beamforming training with the trainee communications device. The one or more predetermined bit sequences are transmitted in at least one sector selected in accordance with a third predetermined rule for a third period of time in accordance with a fourth predetermined rule. An angle of the at least one sector is set in accordance with the configuration of transmitting antenna pattern of the corresponding trainer communications device, and each of the one or more predetermined bit sequences carries an identifier identifying the transmitting trainer communications device. The trainee communications device further receives the one or more predetermined bit sequences in a sector, estimates channel characteristics and computes receiving antenna weighting vectors of the one or more trainer communications devices by using the corresponding received one or more predetermined bit sequences, respectively. The one or more trainer communications devices obtain pertinent information about beamforming training from the trainee communications device, wherein the information comprises the estimated channel characteristics and receiving time of the one or more pre-determined bit sequences at the trainee communications device with the identifier identifying the transmitting trainer communications device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As previously described, conventional beamforming training methods are designed for one-to-one training However, for a communications system with n communications devices, the conventional beamforming training methods may take $O(n^2)$ sessions and at least $O(n^2)$ messages to complete the overall beamforming training of the communications system. For communications devices to exchange data over an asymmetrical channel with asymmetrical antenna configurations, the number of training sessions may be quadrupled in order to establish bi-directional communications paths. In the embodiments of the invention, methods and systems for many-to-one beamforming training methods are introduced. For the many-to-one beamforming training method, one session is needed for one trainee communications device to be trained for its receiving antenna beamforming weighting vectors with a plurality of trainer communications devices allocated in different sectors. The disclosed invention may take only $O(n)$ to complete the beamforming training session for a communications system with n communications devices.

Figure 1:
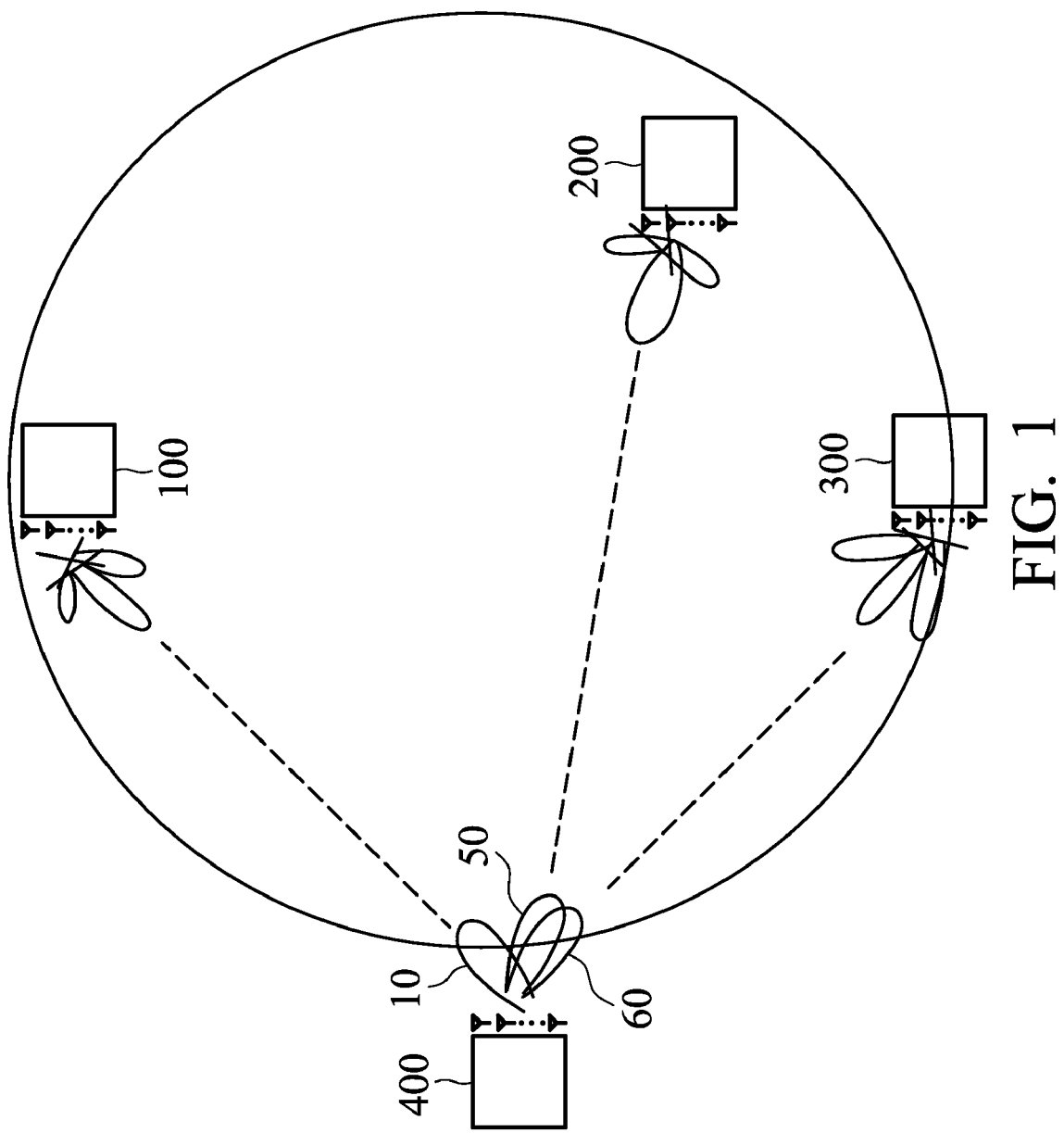
FIG. 1 shows a communications system according to an embodiment of the invention.

FIG. 1 shows a communications system according to an embodiment of the invention. The communications system comprises a plurality of communications devices, for example, the communications devices 100~400. A communications device in the communications system is either a trainer or a trainee communications device. In the embodiments of the invention, the communications devices 100, 200 and 300 are the trainer communications devices and the communications device 400 within the reach of the transmitting signal of the trainer communications devices is the trainee communications device. According to an embodiment of the invention, many-to-one beamforming training may be accomplished during one training session. In other words, one or more trainer communications devices may concurrently train a trainee communications device during one training session.

Figure 2:
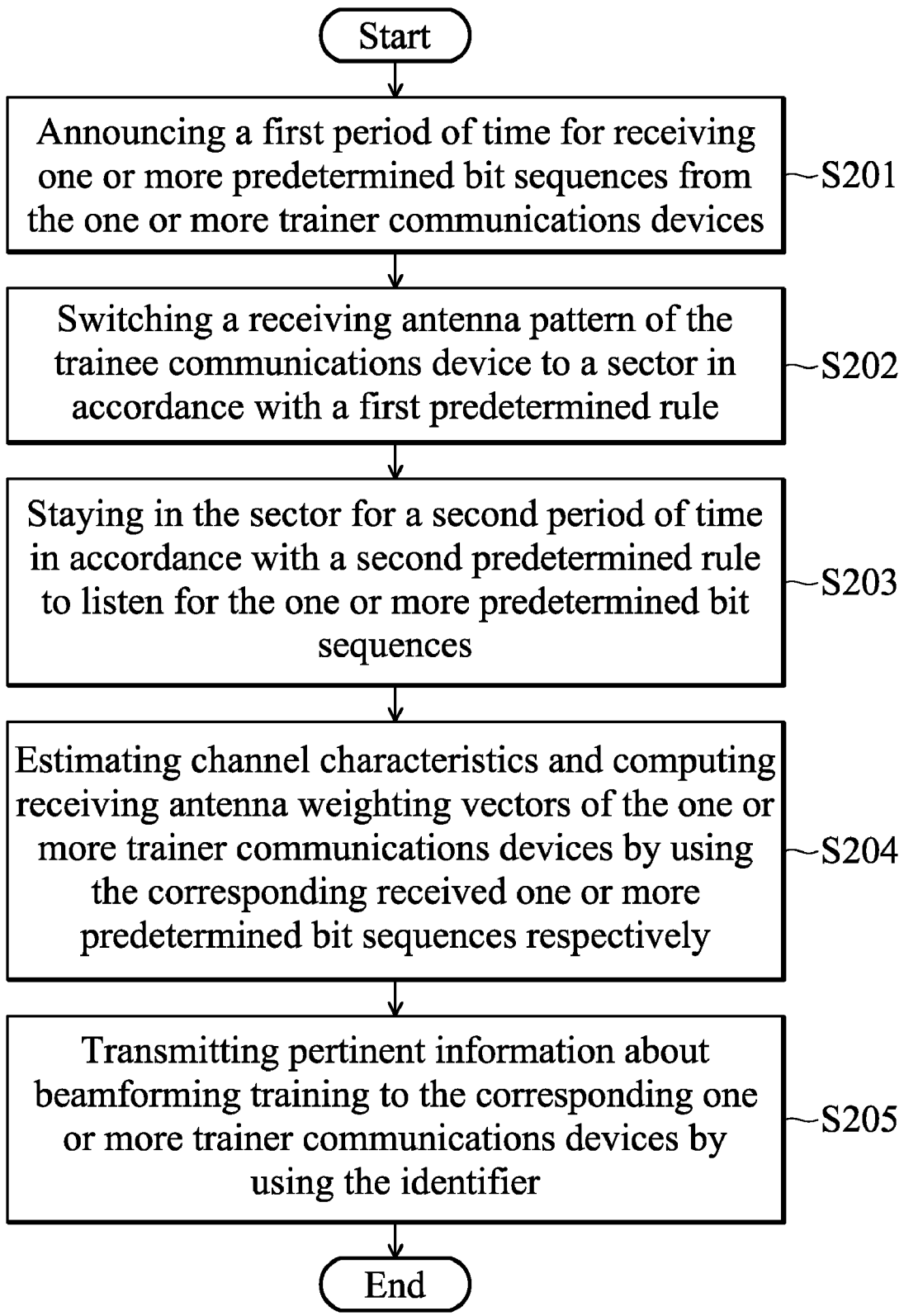
FIG. 2 shows a flow chart of the beamforming training method, performed by the trainee communications device, according to an embodiment of the invention.

FIG. 2 shows a flow chart of the beamforming training method, performed by the trainee communications device, according to an embodiment of the invention. In the embodiment of the invention, any one of the communications devices may detect the presence of one or more of the other communications devices. For training the receiving antenna beamforming weighting vectors of the trainee communications device (such as the communications device 400 shown in FIG. 1) with the one or more trainer communications devices (such as the communications devices 100~300 shown in FIG. 1), after the presence of one or more trainer communications devices are detected, the trainee communications device first announce a first period of time, which is reserved for receiving one or more predetermined bit sequences, namely, beamforming training sequences, from the one or more trainer communications devices (Step S201). Next, the trainee communications device switches receiving antenna pattern to a sector in accordance with a first predetermined rule, where the predetermined angle of the sector is set in accordance with the configuration of the receiving antenna pattern (Step S202), and stays in the sector for a second period of time in accordance with a second predetermined rule to listen for the one or more predetermined bit sequences (Step S203). According to an embodiment of the invention, each of the one or more predetermined bit sequences may carry an identifier, which is a unique identifier identifying a trainer communications device.

According to an embodiment of the invention, the one or more predetermined bit sequences may be sent by using a method that assures that the trainee communications device will be able to receive the one or more predetermined bit sequences. In order to increase the reach of the one or more predetermined bit sequences, a preferred transmission pattern may be a directional beam. A directional beam covers a section of space, that is, a sector, and each sector has a predetermined angle, where the predetermined angle of the sector is set in accordance with the configuration of the transmitting antenna pattern of the communications device transmitting the directional beam. Accordingly, the trainee communications device directs its antenna to switch the receiving antenna pattern to one or more sectors, with a predetermined angle set in accordance with the configuration of the receiving antenna pattern, to receive the one or more predetermined bit sequences from the trainer communications devices. After receiving the one or more predetermined bit sequences, the trainee communications device estimates channel characteristics of the radio channel between the trainee communications device and the corresponding trainer communications device transmitting the one or more predetermined bit sequences, and computes receiving antenna weighting vectors of the one or more trainer communications devices by using the corresponding received one or more predetermined bit sequences, respectively (Step S204). Lastly, the trainee communications device transmits pertinent information about beamforming training to the corresponding one or more trainer communications devices by using the identifier (Step S205). According to the embodiment of the invention, the information comprises the estimated channel characteristics and receiving time of the one or more pre-determined bit sequences, respectively.

As previously described, in order to increase the reach of the one or more predetermined bit-sequences, a preferred transmission pattern is a directional beam. When the directional beam is used for beamforming training, the one or more predetermined bit-sequences may be sent to a plurality of sectors. The plurality of sectors cover the communications space. Therefore, during the first period of time (that is, the training period, or so-called the training session), the trainee communications device switches its receiving antenna pattern to a plurality of sectors, one after another, in accordance with a first predetermined rule, and stay in at least one sector for a second period of time in accordance with a second predetermined rule to receive the one or more predetermined bit sequences. Therefore, in the embodiments of the invention, steps S202 to S205 may be repeatedly performed by the trainee communications device so as to accomplish the beamforming training process with one or more trainer communications devices in the communications system. According to the embodiments of the present invention, the first predetermined rule is for the trainee communications device to step through all sectors in a sequentially or random order, and the second predetermined rule is to make sure the duration the trainee communications device stays in the sector should be long enough to receive at least one of the predetermined bit sequence.

Figure 3:
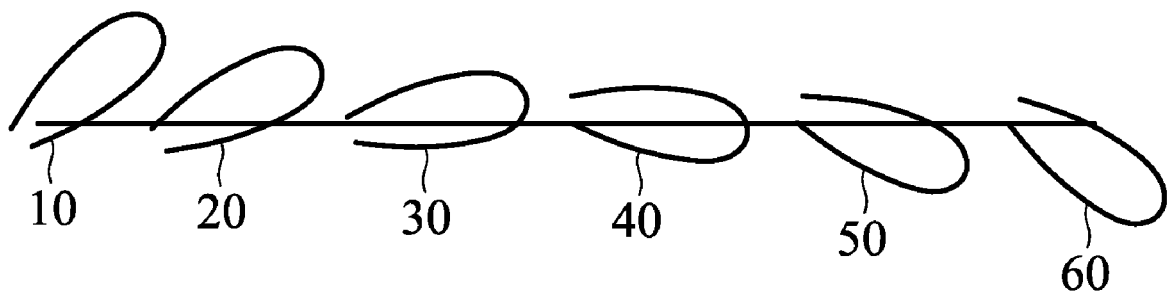
FIG. 3 shows a plurality of exemplary receiving angles of the trainee communications device at different time instances in the reserved time period according to an embodiment of the invention.

FIG. 3 shows a plurality of exemplary receiving angles of the trainee communications device at different time instances 10, 20 . . . and 60 in the reserved first period of time according to an embodiment of the invention. In the embodiments of the invention, the trainee communications device may switch its receiving antenna pattern to a plurality of sectors at different time instances in the first period of time as shown in FIG. 3 in accordance with the first predetermined rule. According to an embodiment of the invention, as shown in FIG. 3, the trainee communications device may step through all sectors in order sequentially. According to another embodiment of the invention, the trainee communications device may step through all sectors in random order. When switching the receiving antenna pattern to a predetermined sector, the trainee communications device may further stay in the predetermined sector for a second period of time in accordance with a second predetermined rule to listen for the one or more predetermined bit sequences. According to an embodiment of the invention, the second predetermined rule may be that the trainee communications device stays in the predetermined sector for the second period of time that is long enough to receive one predetermined bit sequence. According to another embodiment of the invention, the second predetermined rule may be that the trainee communications device stays in the predetermined sector for the second period of time that is long enough to receive more than one predetermined bit sequence.

Figure 4:
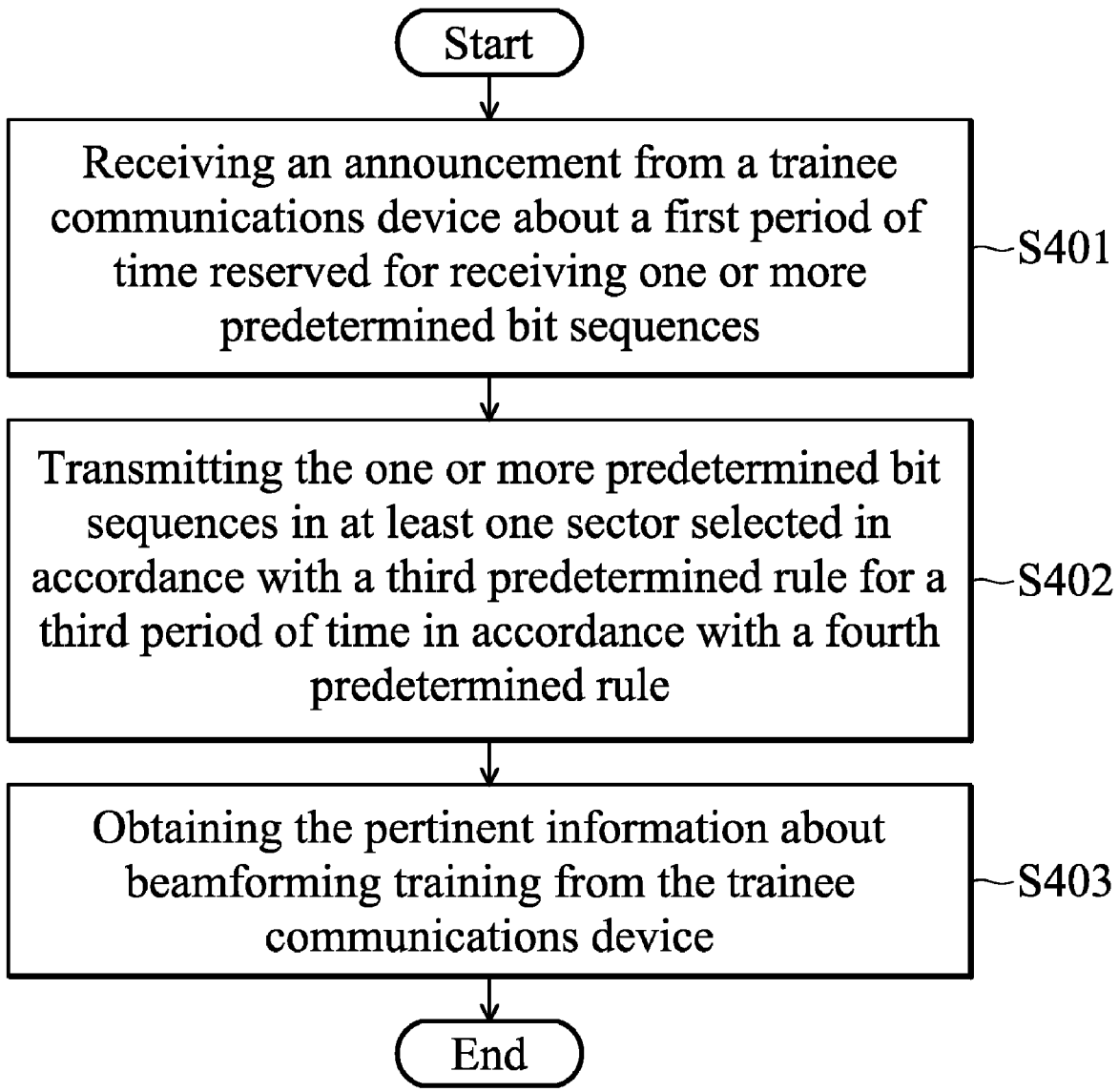
FIG. 4 shows a flow chart of the beamforming training method, performed by the trainer communications devices, according to an embodiment of the invention.

FIG. 4 shows a flow chart of the beamforming training method, performed at a trainer communications devices, according to an embodiment of the invention. After receiving an announcement from a trainee communications device about a first period of time reserved for receiving one or more predetermined bit sequences (Step S401), the trainer communications device (such as the communications devices 100~300 shown in FIG. 1) transmits the one or more predetermined bit sequences in at least one sector selected in accordance with a third predetermined rule for a third period of time in accordance with a fourth predetermined rule (Step S402). In addition, the third predetermined rule is that the one or more trainers transmit the one or more predetermined bit sequences on all sectors in a sequentially order or random order. According to an embodiment of the invention, an angle of the at least one sector is set in accordance with the configuration of transmitting antenna pattern of the corresponding trainer communications device, and each of the one or more predetermined bit sequences carries an identifier, which is a unique identifier identifying the corresponding trainer communications device.

Next, after the trainee communication device (such as the communications device 400 shown in FIG. 1) receiving the one or more predetermined bit sequences, estimating channel characteristics and computing receiving antenna weighting vectors for the trainer communications device by using the corresponding received one or more predetermined bit sequences, and transmitting pertinent information about beamforming training (referring to Steps S203, S204 and S205 in FIG. 2), the trainer communications devices obtain the pertinent information about beamforming training from the trainee communications device (Step 403).

According to an embodiment of the invention, in step S402, the trainer communications device transmits the one or more predetermined bit sequences in one or more, or even all sectors covering the space of communications. When the trainer communications device determines to transmit the one or more predetermined bit sequences in more than one sector, the trainer communications device transmit the one or more predetermined bit sequences in the sectors in a sequentially order (one embodiment of the third predetermined rule). In another aspect, according to another embodiment of the invention, when the trainer communications device determine a to transmit the one or more predetermined bit sequences in more than one sector, the trainer communications device transmits the one or more predetermined bit sequences in the sectors in a random order (another embodiment of the third predetermined rule). In addition, according to the embodiments of the invention, in step S402, the one or more trainer communications device transmits the one or more predetermined bit sequences for a third period of time in accordance with a fourth predetermined rule. For example, according to an embodiment of the invention, the fourth predetermined rule is that the trainer communications device transmits one predetermined bit sequence in a sector. According to another embodiment of the invention, the fourth predetermined rule is that the one or more trainer communications device transmits more than one predetermined bit sequence in a sector. According to yet another embodiment of the invention, the fourth predetermined rule is that the trainer communications device transmits the one or more predetermined bit sequences in a number of sectors.

As previously described, since the one or more trainer communications devices transmit one or more predetermined bit sequences in one or more sectors, the trainee communication device have to know which predetermined bit sequence has been transmitted by what trainee communications device, and/or in which sector has the transmitted predetermined bit sequence been received by the trainee communications device for estimating the channel characteristics. Therefore, according to an embodiment of the invention, the pertinent information obtained by the one or more trainer communications devices in step S403 may comprise the channel characteristics estimated by the trainee communications device and receiving time of the one or more pre-determined bit sequences at the trainee communications device.

Referring back to FIG. 1, according to an embodiment of the invention, the trainer communications device, such as the communications devices 100~300, concurrently transmit the one or more predetermined bit sequences in more than one sector for a period of time so as to train the trainee communications device, such as the communications device 400, in one training session. As previously described, an angle of each sector is set in accordance with the configuration of transmitting antenna pattern of the corresponding transmitting trainer communications device. On the other hand, the trainee communications device switches its receiving antenna pattern to one or more sectors and stays in each sector for another period of time in accordance with the second predetermined rule, where an angle of the sector is set in accordance with the configuration of the receiving antenna pattern. The periods of time for trainer communications device to transmit the one or more predetermined bit sequences and trainee communications device to switch receiving antenna pattern are within the initial reserved period of time so as to accomplish the overall beamforming training in the reserved training period. As an example, the transmitting angle of the trainer communications device 100 at time instances 10, 20, 30, 40, 50 and 60 in the reserved first period of time is shown in FIG. 1, and the predetermined bit sequence sent at time instance 10 is received by the trainee communications device 400. As another example, the transmitting angle of the trainer communications device 300 at time instances 10, 20, 30, 40, 50 and 60 in the reserved first period of time is shown in FIG. 1, and the predetermined bit sequence sent at time instance 60 is received by the trainee communications device 400.

After receiving the one or more predetermined bit sequences, the trainee communications device estimates channel characteristics and computes receiving antenna weighting vectors (AWVs) of the one or more trainer communications devices by using the corresponding received one or more predetermined bit sequences, respectively. According to the embodiments of the invention, the AWVs depicts the characteristics of the one or more transmitting/receiving beams, such as antenna direction or antenna gain pattern. Therefore, different AWVs is associated with different beam patterns. According to an embodiment of the invention, the transmitting and/or receiving beam pattern of the communications device is determined according to at least one of the parameters which comprise phase and strength of transmitting and/or receiving signals, and number of antennas, placement of the antennas and individual transmitting and/or receiving beam patterns of each antenna element of the communications device. In addition, according to an embodiment of the invention, the channel characteristics retrieved according to the received one or more predetermined bit sequences comprises a combination of an antenna direction, a phase rotating vector of the antenna, an optimum antenna configuration . . . and so on. As an example, the trainee communications device computes a weighting vector that maximizes the signal to noise ratio as the training result according to the received one or more predetermined bit sequences, and returns the training result to the corresponding trainer communications device. As another example, the trainee communications device retrieves an optimum antenna code as the training result according to the received one or more predetermined bit sequences, and returns the training result to the corresponding trainer communications device.

As previously described, the pertinent information about beamforming training is transmitted to the one or more trainer communications devices by using the unique identifier. The pertinent information about beamforming training comprises the estimated channel characteristics, and the receiving time of the one or more predetermined bit sequences at the trainee communications device. Thus, the trainer communications device knows which predetermined bit sequence is received by the trainee communications device for estimating the channel characteristic, and/or the predetermined bit sequence received by the trainee communications device for estimating the channel characteristic is transmitted in which sector according to the receiving time carried in the pertinent information.

According to the embodiment of the invention, the beamforming training session may be completed after the one or more trainer communications devices receives the one or more response messages carrying the pertinent information from the trainee communications device. Based on the proposed beamforming training method, more than one trainer communications devices may concurrently train a trainee communications device during one training session so that many-to-one beamforming training is realized.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for beamforming training a trainee communications device with one or more trainer communications devices in a communications system, comprising:
    announcing a first period of time for receiving one or more predetermined bit sequences from the one or more trainer communications devices, wherein each of the one or more predetermined bit sequences carries an identifier identifying a trainer communications device;
    switching a receiving antenna pattern of the trainee communications device to a sector in accordance with a first predetermined rule, wherein an angle of the sector is set in accordance with the configuration of the receiving antenna pattern;
    staying in the sector for a second period of time in accordance with a second predetermined rule and listening for the one or more predetermined bit sequences;
    estimating channel characteristics and computing receiving antenna weighting vectors of the one or more trainer communications devices by using the corresponding received one or more predetermined bit sequences, respectively; and
    transmitting pertinent information about beamforming training to the corresponding one or more trainer communications devices by using the identifier, wherein the information comprises the estimated channel characteristics and receiving time of the one or more pre-determined bit sequences, respectively.

2. The method as claimed in claim 1, further comprising:
    switching the receiving antenna pattern of the trainee communications device to another sector in accordance with the first predetermined rule; and
    staying in the another sector for a third period of time in accordance with the second predetermined rule and listening for the one or more predetermined bit sequences, wherein the switching steps, the staying steps and the listening steps are performed within the first period of time.

3. The method as claimed in claim 1, wherein the second predetermined rule is to stay in a sector for a second period of time that is long enough to listen for one predetermined bit sequence.

4. The method as claimed in claim 1, wherein the second predetermined rule is to stay in a sector for the second period of time that is long enough to listen for more than one predetermined bit sequence.

5. A method for beamforming training a trainee communications device with a trainer communications device in a communications system with a plurality of trainer communications devices, comprising:

receiving an announcement from the trainee communications device about a first period of time reserved for receiving one or more predetermined bit sequences;

transmitting the one or more predetermined bit sequences in at least one sector selected in accordance with a first predetermined rule for a second period of time in accordance with a second predetermined rule, wherein an angle of the at least one sector is set in accordance with the configuration of transmitting antenna pattern of the trainer communications device, and wherein each of the one or more predetermined bit sequences carries an identifier identifying the trainer communications device, and obtaining pertinent information about beamforming training from the trainee communications device, wherein the information comprises channel characteristics and receiving time of the one or more pre-determined bit sequences at the trainee communications device, wherein the channel characteristics is estimated by the trainee communications device by using the received one or more pre-determined bit sequences.

6. The method as claimed in claim 5, wherein the second predetermined rule is transmitting the one or more predetermined bit sequences in one sector in the second period of time.

7. The method as claimed in claim 5, wherein the second predetermined rule is transmitting the one or more predetermined bit sequences in more than one sector in the second period of time.

8. The method as claimed in claim 5, further comprising:

concurrently transmitting the one or more predetermined bit sequences from the plurality of trainer communications devices in more than one sector in the first period of time in accordance with the second predetermined rule, wherein an angle of each sector is set in accordance with the configuration of transmitting antenna pattern of the corresponding transmitting trainer communications device, and wherein each of the one or more predetermined bit sequences carries the identifier identifying the transmitting trainer communications device.

9. A communications system with a plurality of communications devices, comprising:

a trainee communications device announcing a first period of time for beamforming training with one or more trainer communications devices, wherein the trainee communications device switches a receiving antenna pattern to a sector in accordance with a first predetermined rule and stays in the sector for a second period of time in accordance with a second predetermined rule, wherein an angle of the sector is set in accordance with the configuration of the receiving antenna pattern; and one or more trainer communications devices transmitting one or more predetermined bit sequences in the first period of time for beamforming training with the trainee communications device, wherein the one or more pre-determined bit sequences are transmitted in at least one sector selected in accordance with a third predetermined rule for a third period of time in accordance with a fourth predetermined rule, wherein an angle of the at least one sector is set in accordance with the configuration of transmitting antenna pattern of the corresponding trainer communication device, and wherein each of the one or more predetermined bit sequences carries an identifier identifying the transmitting trainer communications device, wherein the trainee communications device receives the one or more predetermined bit sequences in a sector, and estimates channel characteristics and computes receiving antenna weighting vectors of the one or more trainer communications devices by using the corresponding received one or more predetermined bit sequences, respectively, and wherein the one or more trainer communications devices obtain pertinent information about beamforming training from the trainee communications device, and the information comprises the estimated channel characteristics and receiving time of the one or more pre-determined bit sequences at the trainee communications device with the identifier identifying the transmitting trainer communications device.

10. The system as claimed in claim 9, wherein the trainee communications device further switches the receiving antenna pattern to a plurality of sectors in accordance with the first predetermined rule, and the first predetermined rule is to step through all sectors in order sequentially.

11. The system as claimed in claim 9, wherein the trainee communications device further switches the receiving antenna pattern to a plurality of sectors in accordance with the first predetermined rule, and the first predetermined rule is to step through all sectors in random order.

12. The system as claimed in claim 9, the second predetermined rule is that the trainee communications device stays in the sector for the second period of time that is long enough to receive one predetermined bit sequence.

13. The system as claimed in claim 9, wherein the second predetermined rule is that the trainee communications device stays in the sector for the second period of time that is long enough to receive more than one predetermined bit sequence.

14. The system as claimed in claim 9, wherein the third predetermined rule is to transmit the one or more predetermined bit sequences on all sectors in a sequentially order.

15. The system as claimed in claim 9, wherein the third predetermined rule is to transmit the one or more predetermined bit sequences on all sectors in a random order.

16. The system as claimed in claim 9, wherein the fourth predetermined rule is to transmit one predetermined bit sequence in a sector.

17. The system as claimed in claim 9, wherein the fourth predetermined rule is to transmit more than one predetermined bit sequence in a sector.

18. The system as claimed in claim 9, wherein the trainee communications device further switches the receiving antenna pattern to a plurality of sectors within the first period of time and stays in each sector to receive the one or more predetermined bit sequences in accordance with the second predetermined rule.

19. The system as claimed in claim 9, wherein the second and third periods of time are within the first period of time.

* * * * *